US006169064B1

United States Patent
Krogh et al.

(10) Patent No.: US 6,169,064 B1
(45) Date of Patent: *Jan. 2, 2001

(54) AMINE ETHER ACID SALT SURFACTANT COMPOSITION

(75) Inventors: James A. Krogh, Janesville; Michael R. Sipe, Milton, both of WI (US)

(73) Assignee: Tomah Products, Inc., Milton, WI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/896,685

(22) Filed: Jul. 18, 1997

(51) Int. Cl.$^7$ .................................................. C11D 17/00
(52) U.S. Cl. ..................... 510/341; 510/350; 510/433; 510/488; 510/499; 562/588; 564/503; 564/511; 252/352; 554/213; 554/219; 106/287.24; 106/287.26
(58) Field of Search ............................ 562/588; 564/503, 564/511; 554/213, 219; 252/352; 106/287.24, 287.26; 510/341, 350, 433, 488, 499

(56) References Cited

U.S. PATENT DOCUMENTS

| 2,704,280 | 3/1955 | Rutherford ........................... 252/137 |
| 3,347,690 | 10/1967 | Galvin ................................. 106/273 |
| 4,725,358 | * 2/1988 | Ananthapadmanabhan et al. ...................................... 210/634 |
| 4,759,799 | 7/1988 | Vicenzi ........................... 106/281 N |
| 5,362,690 | 11/1994 | Vicenzi et al. ................... 106/284.06 |
| 5,391,325 | 2/1995 | Swenson et al. ..................... 252/547 |
| 5,529,621 | 6/1996 | Hudson et al. ..................... 106/278 |
| 5,618,340 | 4/1997 | Krogh et al. ..................... 106/284.06 |
| 5,622,554 | 4/1997 | Krogh et al. ..................... 106/284.06 |

FOREIGN PATENT DOCUMENTS

07211707 * 8/1995 (JP) .

OTHER PUBLICATIONS

Product brochure from Akzo Chemie describing Redicote CG roof coating composition, Jan. 1994.

Christian, Robert V. Jr. and Hixon, R.M., "The Hydrolysis of Some β–Alkoxypropionitriles", *Journal of American Chemical Society* 70, (Apr. 1948), 1333.

MacGregor, J.H. and Pugh, C., "The Reaction of Acrylonitrile with Aliphatic Alcohols" *Journal of American Chemical Society,* (Apr. 1945), 535.

Knepper, W.A., United States Steel Corporation, "Iron", *Kirk–Othmer Concise Encyclopedia of Chemical Technology*, New York: John Wiley & Sons, Inc. (1985).

Aplan, Frank F., The Pennsylvania State University, "Flotation", *Kirk–Othmer Concise Encyclopedia of Chemical Technology*, New York: John Wiley & Sons, Inc. (1985).

Oberteuffer, John and Wechsler, Ionel, Sala Magnetics, Inc., Magnetic Separation:, *Kirk–Othmer Concise Encyclopedia of Chemical Technology*, New York: John Wiley & Sons, Inc. (1985).

Product brochure from Chemax, Inc. describing MAX-COTE RC 2015 additive for roof coating comp., Jan. 1992.*

Gerhardt et al., Synthesis and Analysis . . . Acids, Tenside Surfactants Detergents, vol. 3, pp. 169–174, 1992.*

* cited by examiner

*Primary Examiner*—Deborah D. Carr
*Assistant Examiner*—Rosalynd Keys
(74) *Attorney, Agent, or Firm*—Jansson, Shupe, Bridge & Munger, Ltd.

(57) ABSTRACT

The disclosure involves a novel amine ether acid salt surfactant. The amine constituent of the surfactant may include ether amines or fatty-based amines. The ether acid constituent of the surfactant, in particular, imparts liquidity to the surfactant. Hydrophobic regions may be included on both the amine and ether acid enhancing the surfactancy of the composition. The novel surfactant is versatile and is useful in many different applications.

18 Claims, 1 Drawing Sheet

Figure 1
Tergotometer Detergency

AMINE ETHER ACID SALT SURFACTANT COMPOSITION

FIELD OF THE INVENTION

This invention is related generally to surfactant compositions and, more particularly, to novel amine ether acid salt surfactants capable of use in a wide variety of applications.

BACKGROUND OF THE INVENTION

Surface-active agents are well known constituents of a broad range of chemical compositions wherein dispersion of the composition constituents is a desired property. Examples of but a few compositions which include surfactants are: roof coating compositions, laundry detergents, inks, paints, hard surface cleaners and spray wax compositions. In applications, such as the diverse applications described above, the surfactant serves as an emulsifying agent concentrating at the oil and water interfaces, thereby dispersing the constituents.

Surfactants also play a significant role in other known applications such as the process of concentrating ores by flotation. In such applications, a pulp of mineral particles is placed in a flotation cell with water and a surfactant. The wettability of materials in the ores, such as silica in iron ore, is altered by the surfactant. The altered materials adhere to air bubbles passed through the flotation cell and float to the surface of the cell permitting skimming and removal of such materials.

Performance, liquidity, cost and ease of manufacture are important considerations with respect to formulation of commercially successful salt surfactants potentially useful in applications such as those described above.

The surfactant should have good surfactant properties including appropriate hydrophobic and hydrophilic groups. Ideally, both the anion and cation would have surfactant properties. Typical prior art salt surfactants are characterized in that only one of the anion or cation has advantageous surfactant properties.

The surfactant must be robust and capable of dispersing other constituents and imparting appropriate viscosity to diverse compositions such as, by way of example only, asphalt-and-clay-based roof coating compositions. These roof coating compositions lack constituent uniformity and can vary greatly depending, for example, on the type of clay used or the oxidation state of the asphalt. Inability of the surfactant to disperse a wide range of constituents can result in loss of viscosity and cause premature failure of the composition.

Low corrosivity is a further desirable surfactant performance characteristic. Salt surfactants of the prior art can tend to be corrosive due to the anion frequently being the negative ion of relatively strong mineral acids in a strong electrolytic environment. Selection of surfactant constituents with low corrosivity is important with respect to expanding the potential range of applications for the surfactant.

The most desired salt surfactants should be liquid and not solid. Liquidity contributes to ease of manufacture and formulation. Liquidity is also an aid in handling and mixing without having to apply heat or use extraordinary mixing equipment. A disadvantage of many prior art salt surfactants is that they tend to be solids, rather than liquids.

Surfactant liquidity further contributes to the overall solubility of the surfactant. A disadvantage of prior art cationic surfactants is that they tend to precipitate out of solution resulting in reduced performance. This is a particular problem in the ore separation process because cationic surfactants of the prior art are known to plate out of solution or crystalize when exposed to the cold temperatures typical of geographic regions at which most ore separation occurs in the United States.

With respect to cost, it is desirable to prepare the surfactant based on precursor materials which are abundant and inexpensive. As those experienced in the art are aware, small price differences per unit volume have a significant effect on product sales and can mean the difference between success or failure in the marketplace.

Cost savings can also be achieved through use of precursor molecules which are comparatively easy to synthesize into the desired end product. Further, precursor molecules should be selected based on the manufacturer's ability to efficiently tailor such precursors to the precise end product form desired by the customer. Surfactants which fail to meet these cost and manufacturing criteria are at a competitive disadvantage. Surfactant composition with good performance and liquidity properties, which is robust and capable of being used in a wide variety of applications, which is easy and cost-effective to manufacture, and which avoids the disadvantages of prior art surfactants would represent a significant advance in the art.

OBJECTS OF THE INVENTION

It is an object of this invention to provide an improved surfactant composition overcoming problems and shortcomings of the prior art.

An object of the invention is to provide an improved surfactant composition which has good dispersion properties in a wide variety of applications.

A further object of this invention is to provide an improved surfactant composition with favorable liquidity and handling properties.

Another object of this invention is to provide an improved surfactant composition which is relatively cost effective.

Yet another object of this invention is to provide an improved surfactant composition which is easy to manufacture.

How these and other objects are accomplished will be apparent from the descriptions of this invention which follow.

DETAILED DESCRIPTION

The invention is an improved amine ether acid salt surfactant. The novel surfactant has many potential practical uses and is particularly efficacious in applications where good dispersion and liquidity properties are desirable. Potential applications for the surfactant include, without limitation, use in roof-coating compositions, spray wax compositions, laundry detergent compositions and even use as an iron ore flotation reagent for the separation of silica from raw iron ore.

The inventive salt surfactant includes an ether acid component and an amine component which may include ether amines. Diamines, triamines and tetramines are also included within the scope of the invention. The ether acid constituent plays an important role in imparting liquidity to the surfactant composition as does the amine when it includes an ether linkage. Branching of either of the surfactant constituents may further enhance liquidity of the salt surfactant.

The ether acid constituent of the surfactant has the following general structural formula:

In the acid constituent, $R^1$ comprises $C_1$–$C_{16}$ and x is 0 or 1.

The amine constituent of the surfactant has the following general structural formula:

$R^2$ comprises H or OH. When $R^2$ is OH, $R^3$ is a $C_2$–$C_6$ alkyl group, $R^4$ is $NH(CH_2CH_2CH_2NH)_y$, y is 0, w is 1 or 2 and when w is 1 v is 1 and when w is 2 v is 0. When $R^2$ is H, $R^3$ is a $C_1$–$C_{20}$ alkyl group, $R^4$ comprises $NH(CH_2CH_2CH_2NH)_y$ or $[O(CH_2CH_2CH_2NH)_z]$, y is 0 to 3, z is 1 to 3, w is 1 and v is 1.

The term "comprises" is used in the claims and in this specification to emphasize that a wide range of isolated and mixed acids and amines are suitable for use in the invention. Description of carbon atom chains in the acids (and amines) by terms such as $C_1$–$C_{16}$ or $C_1$–$C_{20}$ is intended to signify that the chains may have varying conformations including straight, branched and cyclic and may include varying degrees of saturation.

Preferred acids for use in the novel surfactant are selected from the group consisting of: 3-Methoxypropionic acid, 3-Ethoxypropionic acid, 3-Pentoxypropionic acid, 3-Octoxypropionic acid, 3-Decoxypropionic acid, 3-Dodecoxypropionic acid, methoxyacetic acid and mixtures thereof. 3-Pentoxypropionic acid is a most-highly preferred ether acid for use in the composition. Isomers of these acids, including branched, linear and cyclic conformations, are included within the scope of the invention.

Suitable preferred amines are selected from the group consisting of: octoxypropylamine, nonyloxypropylamine, decyloxypropylamine, dodecyloxypropylamine, tridecyloxypropylamine and mixtures thereof. A highly preferred ether amine is decyloxypropylamine. As in the case of the preferred ether acids, isomers of these amines, including branched, linear and cyclic conformations, are included within the scope of the invention.

Fatty-based amines are also preferred for use in the composition. Coco amine and tallow amine, which are themselves mixtures of naturally-occurring fatty-based amines, are preferred. Highly preferred fatty-based amines are selected from the group consisting of: hexylamine, octylamine, decylamine, dodecylamine, tetradecylamine, oleylamine, stearlyamine, linoleylamine, linolenylamine, palmityleylamine, palmitylamine and mixtures thereof.

While not wanting to be bound by any particular theory, it may be that the surfactant is efficacious because both the cation and anion can have good surfactant properties including a charged ionic center and long hydrophobic groups. The hydrophobic groups may also serve to reduce the corrosivity of the salt by shielding the ionic center, and by the fact such salts, if dissociated in water may give rise to relatively weak organic acids.

As will be illustrated by the examples below, the surfactant is robust and capable of imparting surfactant properties to a wide range of compositions. Example 9 below, which is a laundry detergent, is a good example of the surfactant's versatility. In that example, the surfactant may be heated to form a blend of amine ether acid salt surfactant and alkanolamide. This blend has a synergistic cleaning effect useful in removing soils from fabric.

The surfactant has excellent liquidity. The liquidity is imparted by the ether linkages on the acids and, where applicable, on the amines. The potential for branching of the alkyl groups on the acids and amines further contributes to the excellent liquidity of the surfactant.

The surfactant is also advantageous from a cost perspective. Abundant and inexpensive fatty-based amines may be used for the amine constituent of the surfactant.

The ether amines and ether acids are synthesized from alcohol precursors allowing great selectivity in both the appropriate carbon chain length and structure. The ether acids and amines may be synthesized from these alcohol precursors using known synthetic pathways. These pathways include reacting the appropriate alcohol with acrylonitrile followed by hydrolysis of the resulting ether nitrile to form the ether acid. The same, or another, alcohol-based ether nitrile may be reduced to form the other constituent ether amine. As a result, the surfactant constituents can be precisely and efficiently tailored to the specifications of the customer.

Tomah Products, Inc. of Milton, Wisconsin is a major producer of ether amines and ether acids useful in preparing surfactants of the invention. Suitable Tomah Products ether amine or diamine precursors for use in the surfactant include, without limitation, PA-7 (isopropyl-oxypropyl amine), PA-10 (isohexyloxypropyl amine), PA-1214 (a blended octyl/decyloxypropyl amine), PA-14 (decyloxypropyl amine), PA-17 (isotridecyloxypropyl amine) and DA-17 (isotridecyloxypropyl-1,3 diamino propane).

Primary fatty amines useful in the invention are available from a variety of sources. Akzo-Nobel Chemicals, Inc. of Chicago, Ill. and Witco Corporation, Oleo/surfactants Group of Greenwich Connecticut are suppliers of coco amine and tallow amine. Akzo-Nobel sells dodecylamine and Witco Corporation sells oleylamine. BASF Corporation of Mt. Olive, N.J. is a source of hexylamine and octylamine. Nova Molecular Technologies, Inc. of Janesville, Wis. is yet another source of hexylamine. Akzo-Nobel is also a source of dicocoamine, monoethanolamine and diethanolamine. Other fatty amines can be procured through sources such as Aldrich Chemical Company, Milwaukee, Wis.

Tomah Products is also a source for ether acids useful in preparing surfactants of the invention. Ether acids which can be prepared by Tomah Products include: 3-Methoxypropionic acid, 3-Ethoxypropionic acid, 3-Pentoxypropionic acid, 3-Octoxypropionic acid, 3-Decoxypropionic acid and 3-Dodecoxypropionic acid. Methoxyacetic acid is available from Aldrich Chemical Company.

Other constituents useful in making particular compositions including the novel surfactant will be described in the examples which follow.

The inventive amine ether acid salt surfactant is prepared by mixing the amine with the selected acid. The acid is typically present in about an amount required to neutralize the amine. However, these proportions are not critical and may vary depending on the application.

EXAMPLES OF THE INVENTION

The following examples serve to illustrate the efficacy of the inventive surfactant in a wide range of diverse compositions. These examples are not intended to limit the scope of the invention, but rather, serve to emphasize the broad utility of the invention.

A. Exemplary Roof Coating Compositions Including the Novel Surfactant

One exemplary application of the novel surfactant is in asphalt-based, non-asbestos, roof coating compositions. Asphalt-based roof coatings having thick, highly-viscous characteristics have been used for many years to seal joints between roof membranes, join flashings to parapet walls and otherwise repair, seal and protect roof surfaces from exposure to the environment.

Typically, the main constituents of such asphalt-based roof coatings are asphalt, clay and a surfactant. The asphalt is used as a binder and the clay thickens the composition and provides gelling properties. The surfactant is present to produce optimum wetting and dispersion by reducing the interfacial tension between the asphalt and clay.

The asphalt cutback is the predominant formula constituent of the composition and the amount of such asphalt cutback does not vary greatly with respect to the amount of clay and surfactant of such composition. The asphalt cutbacks best suited for the exemplary roof coating compositions may be medium-cure (MC) cutbacks, rapid-cure (RC) cutbacks, or even slow-cure (SC) cutbacks. The asphalt may be oxidized or unoxidized.

Examples of suitable asphalt cutbacks for use in the exemplary roof coating compositions are: Exxon 7057, an MC cutback available from Exxon Corporation, Houston, Tex.; Gardner cutback, an MC cutback available from Gardner Asphalt Company, Tampa, Fla.; Trumbull 6009 (oxidized) and 6032 (unoxidized), available from Trumbull Asphalt, Summit, Ill.; Monsey asphalt cutback from Monsey Products Co. Kimberton, Pa.; Brewer Asphalt Co. AC-20 cutback from Brewer Asphalt Co. Milford, Ohio; and the asphalt cutback from Seaboard Asphalt Products Company, Baltimore, Md.

Attapulgite clays are preferred for use as the clay component. The attapulgite clays are specially-sized and processed gelling clay products suitable for thickening asphalt-based coatings. Examples of suitable clays include: Min-U-Gel AR, an attapulgite available from Floridin Company, Berkeley Springs, W.V., and attapulgites known as ATTA-GEL 36, 40, 50 and 2059, available from Engelhard Corporation, Edison, N.J. Such clays are available commercially in different particle sizes. Other clays may be used, but the attapulgites are highly preferred.

Any of the above-listed amine ether acid surfactants would be suitable for use in the exemplary roof coating compositions. Specific examples of suitable amine ether acid salt surfactants for use in the roof coating surfactant are identified in each of the following Examples 1–6.

In addition to the foregoing constituents, additives known as fillers may be included to provide bulk and other properties to the roof coating composition. Examples of acceptable fillers are sand, mica, ground slate, diatomaceous earth, ground limestone, wollastonite, pearlite, cellulosic fibers, talc, and polyolefin fibers.

Preparation of the exemplary roof coating compositions will vary somewhat depending on the particular constituents to be used in the composition and the type of mixing apparatus available for processing of the constituents. These processing steps are not critical and, while considerable variation is possible, certain blending procedures are preferred.

The inventive amine ether acid salt surfactant is prepared by mixing the amine with the selected acid, said acid being present in amounts essentially sufficient to neutralize the amine. Blending of the asphalt, clay and surfactant components tends to vary based on the processing equipment to be used. In general, if a high-shear mixer is used, the preferred order of addition involves first mixing the asphalt cutback, surfactant, and clay until they are gelled. Then any fillers are added and mixed with the gelled composition. If low-shear equipment, such as a paddle or ribbon mixer, is employed (or if the clay concentration is low in a high-shear mixer batch), the use of a pre-gelling technique is recommended to enhance gelling and optimize dispersion. The preferred pre-gelling process consists of thoroughly mixing all of the surfactant with all of the clay and a portion of the asphalt cutback (preferably about two-thirds) until a thick gel is formed. Then the remainder of the cutback and all of the filler(s) are added and thoroughly mixed. Additional solvent can be added if required after the mix is uniform.

The choice and amount of fillers added in the mix depend in part upon whether the composition is to be a brushable roof coating, a sprayable coating, or a roof cement. The desired final viscosity and texture of the asphalt coating composition can be adjusted by the fillers which are added.

Determining the optimum amount of the inventive amine ether acid salt surfactant in a coating is critical. The optimum is considered the greatest amount of clay to surfactant providing the desired gel characteristics and stability. This ratio of clay to surfactant is known in the industry as the "C/S ratio." The optimum ratio depends primarily on the specific amine and acid precursors selected, the asphalt used, the degree of asphalt oxidation, and the clay used. Therefore, an optimum ratio must be determined for each combination.

One method of determining the optimum C/S ratio is to run a ladder of C/S ratios in a mix of a particular ratio of the chosen clay to the combination of the surfactant and chosen asphalt cutback—for example, 12 parts by weight clay to 88 parts by weight asphalt cutback and surfactant combined.

The C/S ratio may then be varied in 0.5/1 increments (within what is considered an acceptable range), and readings on the gel characteristics of the resulting compositions should be taken at periodic intervals after mixing (such as 24 and 36 hours and several times during a week until a final reading one week after mixing). Temperature and pressure conditions should preferably be controlled during the period of such testing.

The range of ratio increments tested need not be broad, but may start, for example, around 8:1 and extend to perhaps 10:1 or 12:1. Once the optimum C/S ratio is established for a particular asphalt cutback and clay, the same "recipe" can be used with confidence and without further testing to produce coating compositions of this invention made with such cutback and clay at the predetermined C/S ratio.

The instruments and procedures for measuring gel characteristics will not be described here. It is preferred that the recommended ASTM test procedures be used, but any appropriately sensitive test instrument (such as a good penetrometer) and reliable test procedure will be acceptable if properly used.

Large variations in the readings of the gel characteristics over the course of the test period indicate a lack of gel stability. This tends to indicate an unacceptable C/S ratio or some other unacceptable characteristic in the formula. Steady readings are what is desired, provided they show sufficient gel strength.

In each of Examples 1–6, a surfactant of the invention was used to make an asphalt-based roof coating composition using either low-shear or high-shear blending techniques, adding and mixing the listed constituents in the manner described above. For each example the formulation is listed and comments regarding the formulation or the resulting composition are given.

Example 1

| | |
|---|---|
| Trumbull Asphalt Cutback #6009 | 87.00 parts |
| Attagel 36 | 12.00 parts |
| Surfactant | 1.00 part |

This composition represents a spreadable, gelled mixture suitable for testing the viscosity for the clay/surfactant (C/S) ratio optimization. It includes an oxidized asphalt cutback, an attapulgite clay and a surfactant consisting of isodecyloxypropylamine (Tomah Products PA-14) mixed with a 1.0 molar equivalent of 3-Methoxypropionic acid.

Example 2

| | |
|---|---|
| Trumbull Asphalt Cutback #6032 | 87.00 parts |
| Attagel 36 | 12.00 parts |
| Surfactant | 1.00 part |
| Talc | 21.00 parts |
| Interfiber 231 | 3.00 parts |

This composition represents a marketable roof coating mixture consisting of an unoxidized asphalt cutback, an attapulgite clay, a surfactant and fillers added for bulk. The surfactant is composed of isodecyloxypropylamine (Tomah Products PA-14) mixed with 1.5 molar equivalents of isobutoxypropionic acid.

Example 3

| | |
|---|---|
| Brewer Asphalt Co. AC-20 cutback | 86.00 parts |
| Min-U-Gel AR | 12.00 parts |
| Surfactant | 2.00 parts |
| Sand | 21.00 parts |
| Ground slate | 5.00 parts |

This composition includes an industrial cutback attapulgite clay, fillers to supply appropriate bulk, and a surfactant comprised of a mixture of the amines, octadecyloxypropylamine and hexadecyloxypropylamine (Tomah Products PA-2220) mixed with a 1.0 molar equivalent of isohexoxypropionic acid.

Example 4

| | |
|---|---|
| Monsey asphalt cutback | 89.70 parts |
| Min-U-Gel G35 | 9.00 parts |
| Surfactant | 1.30 part |
| 325 Mesh Silica | 21.00 parts |

This composition uses a lower clay loading to produce gel characteristics consistent with roof coating compositions. It consists of an asphalt cutback as used in industry, an attapulgite clay, fillers to supply bulk and a surfactant comprised of a cocoamine mixed with 0.9 molar equivalents of n-pentoxypropionic acid.

Example 5

| | |
|---|---|
| Gardner Asphalt cutback | 88.50 parts |
| Min-U-Gel AR | 10.00 parts |
| Surfactant | 1.50 parts |
| Diatomaceous earth | 18.00 parts |
| Interfibe 231 | 3.00 parts |

This example combines an industrial asphalt cutback with an attapulgite clay, a surfactant, and filler to impart proper bulk. The surfactant is comprised of an n-octoxypropylamine (Tomah Products PA-12) mixed with 1.0 molar equivalent of an alkyoxypropionic acid mixture where the alkyl group has a carbon chain length ranging from C6 to C12 consistent with the mix obtained from the linear C6, C8, C10 and C12 alcohol stream from Union Carbide as distributed by O'Brien Industries, Inc. Twinsburg, Ohio.

Example 6

| | |
|---|---|
| Trumbull Asphalt cutback #6032 | 88.00 parts |
| Attagel 36 Attapulgite Clay | 11.00 parts |
| Surfactant | 1.00 parts |
| 325 Mesh Silica | 21.00 parts |

This composition uses an unoxidized asphalt cutback, attapulgite clay, filler for bulk and a surfactant consisting of isononyloxypropylamine (Tomah Products PA-13) admixed with 1.0 molar equivalent of methoxyacetic acid (Aldrich Chemical Co.).

The examples described herein are applied to various surfaces in the same manner as the compositions of the prior art are applied. They are usable as roof coatings, roof cements, vehicle undercoatings, pipe coatings, mastics and adhesives, and for many other purposes.

B. Exemplary Spray Wax Compositions Including the Novel Surfactant

A further exemplary application of the novel surfactant is in "spray wax" compositions. "Spray wax" coatings are often used with automatic vehicle cleaning machines (for example, automatic car washes) to improve the appearance of the vehicle and facilitate the automated cleaning process. The term "spray wax" is a generic term used in the industry to describe coatings which may or may not actually include wax constituents. The spray wax is typically applied to the vehicle after washing and during the final rinse cycle. The spray wax plates onto the vehicle body surface and provides a gloss or luster to the surface thus improving the perceived appearance of the vehicle.

The spray wax also facilitates the automated cleaning process because it aids in drying and in removal of water from the vehicle. Specifically, the hydrophobic constituents of the spray wax cause water on the vehicle surface to bead. Beading of water on the body surface is desirable because the air jet from the drier removes beaded water more efficiently than water which is not beaded.

The exemplary spray wax compositions described herein may be prepared and sold without water as a dilutable concentrate or in a dilute pre-mixed form to which additional water may be added. Typically the dilute premixed form of the inventive formula includes about 35 to 45% active spray wax.

The exemplary spray wax formulations were prepared by mixing about 15 grams of surfactant, 3 grams of a coupling agent and 20 grams of a hydrophobe with a spatula until homogeneous. (Optionally, acid such as acetic acid, may be added to adjust the HLB.)

61 grams of tap water were then added in approximately 10 gram increments with stirring between each addition. After going through a hazy phase, the mixtures cleared when about ⅓ of the water had been added and stayed clear when all of the water was in the emulsion, making what is termed a "39% active spray wax." The 39% active spray wax is intended to be diluted further with water before application to the vehicle surface. Typically the spray wax is applied to a vehicle surface in a dilute form having about 0.25 to 2% active constituents.

The surfactant of Example 7 was prepared using a branched ether diamine sold by Tomah Products as DA-17. Example 8 was prepared using a linear Tallow diamine also available from Tomah Products. The anion constituent of the surfactants of Examples 7 and 8 was isodecyloxypropionic acid, a branched ether acid prepared by Tomah Products. It should be noted that the spray wax compositions are not limited to only these surfactants. Other acids, such as the glacial acetic acid shown in Examples 7 and 8 are optional and are used for adjusting the HLB of the surfactant.

The coupling agent in Examples 7 and 8 was Dow Chemical Dowanol PNB, although other coupling agents such as Union Carbide Butyl Cellosolve may be used. The coupling agent is a solvent which greatly aids in the coupling of incompatible fluids such as oil and water and prevents thickening and gelation when the composition is diluted with water. Such gelation can cause problems in automatic car washes when it is desired to inject the inventive composition into a water stream or when mixing it in a tank. Up to about 50t of the composition can consist of a coupling agent.

The hydrophobe is present to aid in beading of the water on the vehicle surface and to impart a luster to the surface. A suitable hydrophobe is Mineral Seal Oil available from Calumet Lubricants, Co. of Indianapolis, Ind., available as Kermac 600 MSO.

The specific constituents and constituent concentrations of Example 7 are as follows:

Example 7

| | |
|---|---|
| Tomah Products DA-17 Ether Diamine | 9.68% |
| Isodecylpropionic Acid | 9.92% |
| Glacial Acetic Acid | 1.42% |
| Dowanol PnB | 20.98% |
| Kermac 600 MSO | 58.00% |

The exemplary formulation of Example 7 was tested for efficacy in a split hood beading test. The formulation used for the test included 3 grams of a 39% form of the spray wax mixed in one gallon of water. The dilute water/spray wax mixture was poured over a vehicle hood. The water/spray wax mixture formed the desired water beads on the vehicle surface.

Example 8

| | |
|---|---|
| Tomah Products Tallow diamine | 9.73% |
| Tomah Products Isodecyl Ether Acid | 9.87% |
| Glacial Acetic Acid | 1.47% |
| Dowanol PnB | 20.93% |
| Kermac 600 MSO | 58.00% |

Example 8 shows another exemplary spray wax composition including the inventive surfactant which consists of a fatty-based diamine and an ether carboxylic acid. Also included is an optional acid for adjustment of the HLB as is a glycol ether coupling agent and a mineral seal oil hydrophobe.

Split hood beading tests were conducted to compare the efficacy of the spray wax compositions of Examples 8 and 9. The spray waxes of Examples 8 and 9 were separately prepared in 39% spray wax formulations and then diluted further by addition of one gallon of water.

The formulations were poured on separate portions of the vehicle hood. Observations were made of the beading which occurred. The formulation of Example 9 beaded about 10 times faster than the formulation of Example 8 causing the hood surface to dry faster. However, both formulations beaded water and are acceptable for use in commercial spray wax formulations.

C. Exemplary Ore Separation Compositions Including the Novel Surfactant

Another exemplary application of the novel surfactant is in the process of concentrating ores by flotation. It has been found that the novel surfactant is effective in adjusting the wettability of silica in iron ore so that the silica can be removed during the flotation process. It is expected that the surfactant would be useful to adjust the wettability of other materials.

In the flotation separation process, a pulp of iron ore containing silica is deposited in an ore flotation cell which is filled with water and surfactant. The silica complexes with the surfactant and adheres to air bubbles introduced into the cell water forming a froth containing the silica on the water surface. The froth containing the silica is then skimmed from the surface of water leaving a more concentrated iron ore in the cell. This process can be repeated until the ore reaches the desired purity.

A comparison of silica removal from three types of iron ore was made. The purpose of the test was to determine the efficacy of an amine ether acid salt surfactant in removing silica from iron ore as compared to prior art unneutralized amines. Specifically, a salt surfactant comprising Tomah Products PA-1214 (octyl/decyloxypropyl amine) neutralized with 10k 3-Pentoxypropionic acid was evaluated against unneutralized PA-1214.

Three types of presently-mined iron ore designated 60/20/20, Mar. Mas. and High Phosphate were placed in an laboratory flotation device. The ore was in a pulp or powdered form. Water and surfactant were added and air bubbles passed through the water. The data reflecting percent iron recovered are reproduced in Table 1 below. The concentration of surfactant in pounds per long ton of ore is presented in the third column of Table 1. All of the data have been standardized for results at 4.85% silica.

TABLE 1

Est. Grade & Recovery
Based on 4.85% SiO,

| Test No. | Surfactant Tested | Surfactant Concentration (Lbs/Ton Ore) | Ore Type | Concentration Before Flotation | | Concentration After Flotation | | % Wt | % Fe Rec. | % P Dist. |
|---|---|---|---|---|---|---|---|---|---|---|
| | | | | % Fe | % P | % Fe | % P | | | |
| 3283 | PA-1214 | 0.34 | 60/20/20 | 34.7 | 0.027 | 60.4 | 0.030 | 45.0 | 78.2 | 50.3 |
| 3268 | PA-1214 | 0.34 | 60/20/20 | 35.2 | 0.027 | 61.5 | 0.029 | 42.8 | 74.7 | 48.2 |
| 3270 | PA-1214 | 0.34 | 60/20/20 | 35.0 | 0.026 | 61.7 | 0.029 | 44.3 | 77.8 | 49.1 |
| 3272 | PA-1214/ ether acid | 0.34 | 60/20/20 | 35.0 | 0.025 | 60.9 | 0.027 | 44.4 | 77.3 | 47.8 |
| 3273 | PA-1214/ ether acid | 0.40 | 60/20/20 | 34.9 | 0.025 | 60.8 | 0.027 | 44.4 | 77.4 | 48.8 |
| 3473 | PA-1214 | 0.34 | Mar.Mas. | 35.7 | 0.020 | 66.7 | 0.025 | 37.2 | 69.4 | 46.2 |
| 3477 | PA-1214 | 0.34 | Mar.Mas. | 35.5 | 0.021 | 67.0 | 0.024 | 37.2 | 70.2 | 43.3 |
| 3474 | PA-1214/ ether acid | 0.34 | Mar.Mas. | 35.9 | 0.020 | 66.6 | 0.023 | 37.2 | 68.9 | 42.5 |
| 3478 | PA-1214/ ether acid | 0.34 | Mar.Mas. | 35.6 | 0.020 | 67.1 | 0.023 | 36.2 | 68.3 | 42.2 |
| 3475 | PA-1214 | 0.34 | Hi.Phos | 36.8 | 0.040 | 65.9 | 0.035 | 37.7 | 67.5 | 33.4 |
| 3479 | PA-1214 | 0.34 | Hi.Phos | 36.3 | 0.040 | 66.0 | 0.034 | 38.2 | 69.4 | 32.4 |
| 3476 | PA-1214/ ether acid | 0.34 | Hi.Phos | 36.5 | 0.041 | 66.3 | 0.036 | 38.4 | 69.6 | 34.0 |
| 3480 | PA-1214/ ether acid | 0.34 | Hi.Phos | 36.2 | 0.041 | 65.9 | 0.036 | 39.1 | 71.1 | 34.5 |

The percent iron composition for all three types of ore before floatation ranged from about 34.7%–36.8% as seen in the fifth column, labeled "% Fe." The percent iron following floatation ranged from about 60.4%–67.1% iron as indicated in the seventh column, labeled "% Fe." In all cases, the percent iron recovered following silica separation was about 67.5–78.2% as shown in the column marked "% Fe Rec."

These data show that both surfactants are efficacious in separating silica from iron ore. However, it is expected that the inventive PA-1214/ether acid salt surfactant would have superior properties. These advantageous properties would include better solubility and a decreased likelihood of precipitating out of solution because of the ionic character of the salt surfactant.

D. Exemplary Laundry Detergent Compositions Including the Novel Surfactant and Alkanolamides Yet another potential application for the novel surfactant is as a laundry detergent. It has been found that amine ether acid salts, and alkanolamides formed after heating the salts, form a synergistic detergent blend which is effective in removing soil from fabric.

The exemplary surfactant was prepared by first treating monoethanolamine with sodium borohydride at 70° C. for one hour. This solution was added to an equimolar amount of isodecyloxypropionic acid over a period of 15 minutes. The amine ether acid mixture was then heated to 155° C. for approximately 1.5 hours. The end products of this reaction are approximately 38% monoethanolamine isodecyloxypropionic acid salt surfactant and 62% alkanolamide.

Different surfactant/alkanolamide ratios result from different heating durations. For example, a 60% monoethanolamine isodecyloxypropionic acid salt surfactant and 40% alkanolamide blend composition results from heating the surfactant for approximately 30 minutes, while a 10% monoethanolamine isodecyloxypropionic acid salt surfactant and 90% alkanolamide composition blend results from heating the composition approximately 4 hours.

Figure 1:
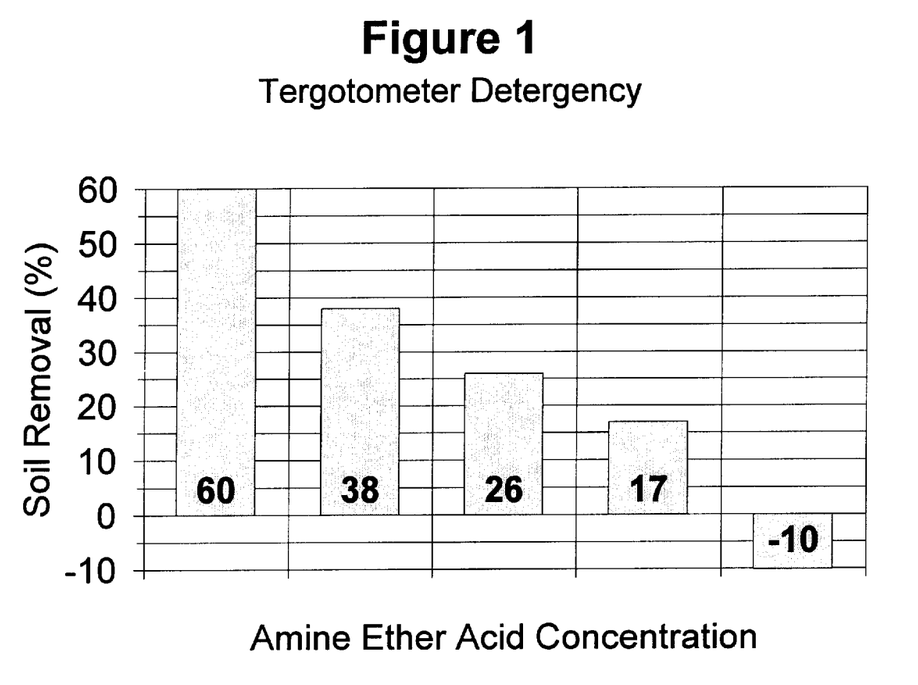
FIG. 1 is a graph showing the efficacy of one exemplary surfactant composition with respect to removing soil from fabric.

Five detergent compositions were prepared using 96.6% water and 0.40% of the monoethanolamine isodecyloxypropionic acid salt surfactant/alkanolamide blend. The exemplary compositions varied in their amine ether acid concentration as shown in FIG. 1. These detergent compositions were evaluated in a tergotometer to measure each detergent's ability to remove artificially applied soils from fabric using ASTM test designation D-3050-87.

The tergotometer tests were conducted at 20° C., 0 ppm water hardness with dust sebum on cotton polyester soiled fabric. As shown in FIG. 1, it was found that over 45% of the soil was removed by the detergent composition including 38% monoethanolamine isodecyloxypropionic acid salt surfactant and 62% alkanolamide. Also as shown in FIG. 1, the percent soil removal decreased as the amine ether acid concentration increased or decreased. Thus, the optimal exemplary detergent composition was found to be as follows:

Example 9

| | |
|---|---|
| Monoethanolamine Isodecyloxypropionic Acid Salt Surfactant (38% concentration) | 1.30% |
| Monoalkanolamide (62% concentration) | 2.10% |
| Water | 96.60% |

These data show that the novel surfactant can be used as an efficacious laundry detergent. This is a preferred method of making a laundry detergent such as the alkanolamide detergent described in U.S. Pat. No. 2,704,280 (Trowbridge). Moreover, the blended surfactant of example 9 is believed to be more efficacious than the isolated alkanolamide surfactant described in the Trowbridge patent.

While the principles of this invention have been described in connection with specific embodiments, it should be understood clearly that these descriptions are made only by way of example and are not intended to limit the scope of the invention.

What is claimed is:

1. A liquid amine ether acid salt surfactant concentrate composition comprising the reaction product of:
at least one acid having the general structural formula:

$$R^1\text{—}OCH_2(CH_2)_x\text{—}CO_2H$$

wherein
R$^1$ comprises C$_1$–C$_{16}$ and when R$^2$ is H and R$^3$ is a C$_1$–C$_{20}$ alkyl group, R$^1$ is branched and C$_3$–C$_{16}$; and x is 0 or 1; and
at least one amine having the general structural formula:

$$[R^2\text{—}(R^3)]_w\text{—}R^4H_v$$

wherein
R$^2$ comprises H or OH;
when R$^2$ is OH, R$^3$ is a C$_2$–C$_6$ alkyl group, R$^4$ is NH(CH$_2$CH$_2$CH$_2$NH)$_y$, y is 0, w is 1 or 2 and when w is 1 v is 1 and when w is 2 v is 0;
when R$^2$ is H, R$^3$ is a C$_1$–C$_{20}$ alkyl group, R$^4$ comprises NH(CH$_2$CH$_2$CH$_2$NH)$_y$ or O(CH$_2$CH$_2$CH$_2$NH)$_z$, y is 0 to 3, z is 1 to 3, w is 1 and v is 1; and
wherein the acid is present in an amount of about 0.9 to 1.5 molar equivalents relative to the amine.

2. The composition of claim 1 wherein the acid is selected from the group consisting of 3-Methoxypropionic acid, 3-Ethoxypropionic acid, 3-Pentoxypropionic acid, 3-Octoxypropionic acid, 3-Decoxypropionic acid, 3-Dodecoxypropionic acid, methoxyacetic acid and mixtures thereof.

3. The composition of claim 2 wherein the acid is 3-Pentoxypropionic acid.

4. The composition of claim 1 wherein the amine is selected from the group consisting of octoxypropylamine, nonyloxypropylamine, decyloxypropylamine, dodecyloxypropylamine, tridecyloxypropylamine and mixtures thereof.

5. The composition of claim 4 wherein the amine is decyloxypropylamine.

6. The composition of claim 1 wherein the amine is selected from the group consisting of coco amine and tallow amine.

7. The composition of claim 6 wherein the amine is selected from the group consisting of hexylamine, octylamine, decylamine, dodecylamine, tetradecylamine, oleylamine, stearylamine, lin oleylamine, linolenylamine, palmityleylamine, palmitylamine and mixtures thereof.

8. A liquid amine ether acid salt surfactant concentrate composition comprising:

$$[[R^2\text{—}(R^3)]_w\text{—}R^4H_v]+[R^1\text{—}OCH_2(CH_2)_x\text{—}CO_2]-$$

wherein, with respect to the anion
R$^1$ comprises C$_1$–C$_{16}$ and when R$^2$ is H and R$^3$ is a C$_1$–C$_{20}$ alkyl group, R$^1$ is branched and C$_3$–C$_{16}$; and x is 0 or 1; and
wherein, with respect to the cation
R$^2$ comprises H or OH,
when R$^2$ is OH, R$^3$ is a C$_2$–C$_6$ alkyl group, R$^4$ is NH(CH$_2$CH$_2$CH$_2$NH)$_y$, y is 0, w is 1 or 2 and when w is 1 v is 1 and when w is 2 v is 0;
when R$^2$ is H, R$^3$ is a C$_1$–C$_{20}$ alkyl group, R$^4$ comprises NH(CH$_2$CH$_2$CH$_2$NH)$_y$ or O(CH$_2$CH$_2$CH$_2$NH)$_z$, y is 0 to 3, z is 1 to 3, w is 1 and v is 1; and
wherein the anion is present in an amount of about 0.9 to 1.5 molar equivalents relative to the cation.

9. The composition of claim 8 wherein the anion is selected from the group consisting of 3-Methoxypropionate anion, 3-Ethoxypropionate anion, 3-Pentoxypropionate anion, 3-Octoxypropionate anion, 3 Decoxypropionate anion, 3-Dodecoxypropionate anion, methoxyacetate anion and mixtures thereof.

10. The composition of claim 9 wherein the anion is 3-Pentoxypropionate anion.

11. The composition of claim 8 wherein the cation is selected from the group consisting of octoxypropylammonium cation, nonyloxypropylammonium cation, decyloxypropylammonium cation, dodecyloxypropylammonium cation, tridecyloxypropylammonium cation and mixtures thereof.

12. The composition of claim 11 wherein the cation is decyloxypropylammonium cation.

13. The composition of claim 8 wherein the cation is selected from the group consisting of coco ammonium cation and tallow ammonium cation.

14. The composition of claim 13 wherein the cation is selected from the group consisting of hexylammonium cation, octylammonium cation, decylammonium cation, dodecylammonium cation, tetradecylammonium cation, oleylammonium cation, stearylammonium cation, linoleylammonium cation, linolenylammonium cation, palmityleylammonium cation, palmitylammonium cation and mixtures thereof.

15. The composition of claim 1 wherein the amine is an ether diamine.

16. The composition of claim 1 wherein the amine is a fatty diamine.

17. The composition of claim 8 wherein the cation is an ether diammonium cation.

18. The composition of claim 8 wherein the cation is a fatty diammonium cation.

* * * * *

UNITED STATES PATENT AND TRADEMARK OFFICE
CERTIFICATE OF CORRECTION

PATENT NO. : 6,169,064 B1
DATED : January 2, 2001
INVENTOR(S) : Jame A. Krogh and Michael R. Sipes Page 1 of 1

It is certified that error appears in the above-identified patent and that said Letters Patent is hereby corrected as shown below:

Column 9,
Line 43, change "50t" to -- 50% --.

Column 10,
Line 57, change "10k" to -- 10% --.

Column 11,
Line 12, of the table, change "42.2" to -- 42.1 --.

Signed and Sealed this

Twenty-first Day of August, 2001

Attest:

*Nicholas P. Godici*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,169,064 B1  
DATED : January 2, 2001  
INVENTOR(S) : Krogh et al.

Page 1 of 1

It is certified that error appears in the above-identified patent and that said Letters Patent is hereby corrected as shown below:

Drawings,  
Delete figure 1 and substitute therefor the figure below.

Signed and Sealed this

Twelfth Day of October, 2004

JON W. DUDAS  
*Director of the United States Patent and Trademark Office*